S. G. GRADY.
TOOL HOLDER.
APPLICATION FILED MAY 8, 1914.
1,146,770.
Patented July 13, 1915.
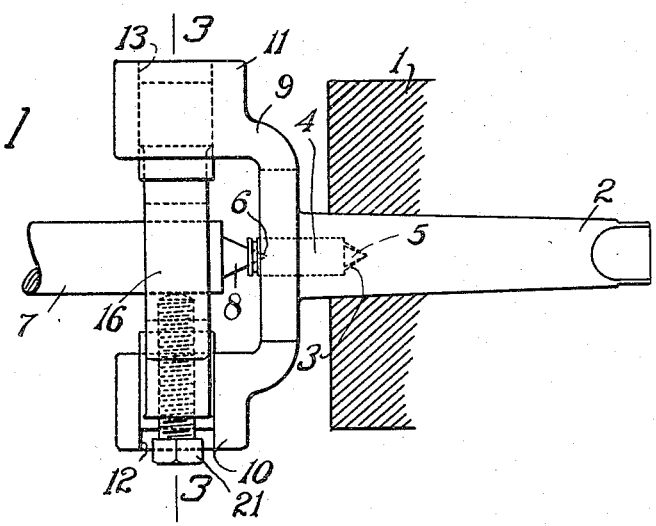
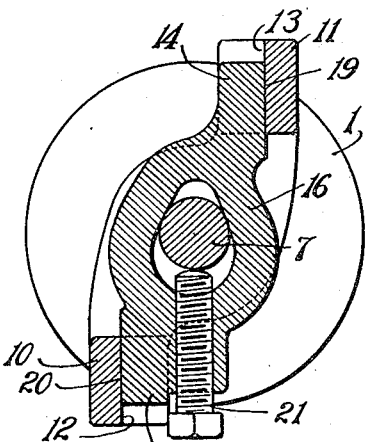
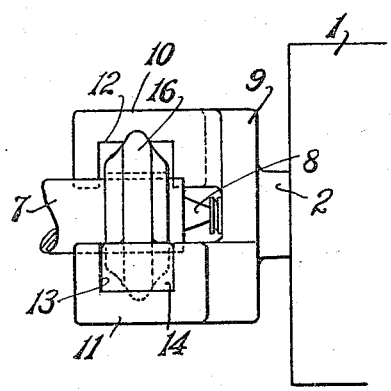
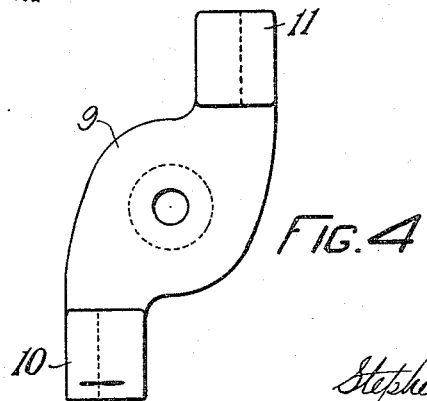
WITNESSES
A. T. Palmer
H. W. Kelso.
INVENTORS
Stephen G. Grady.
BY Richard P. Elliott
ATTY.

UNITED STATES PATENT OFFICE.

STEPHEN G. GRADY, OF BOSTON, MASSACHUSETTS, ASSIGNOR TO LORENZ MUTHER, OF NEWTON, MASSACHUSETTS.

TOOL-HOLDER.

1,146,770.   Specification of Letters Patent.   Patented July 13, 1915.

Application filed May 8, 1914. Serial No. 837,301.

*To all whom it may concern:*

Be it known that I, STEPHEN G. GRADY, a citizen of the United States, residing in Roxbury district, city of Boston, county of Suffolk, State of Massachusetts, have invented certain new and useful Improvements in Tool-Holders, of which the following is a specification, reference being had to the drawings accompanying the same and forming a part thereof.

My invention relates to a tool holder for holding drills, reamers, taps, boring tools and the like, while they are used in lathe drills, boring machines, and other similar machines.

The objects of my invention are to provide a tool holder in which various sizes of tools, such as drills, reamers, taps, boring tools and similar articles may be secured in the holder against rotative and axial movement with relation to the holder.

A further object of my device is to provide a holding and centering device so made and arranged that it can be used with tools having either a male or female center or without any center.

In the drawings accompanying this specification and forming a part thereof Figure 1 shows the device with a section of the end of the drill or reamer having a male center secured in the holder, with the holder shown as secured in the tail-stock of a lathe or boring machine. This view is what might be termed a side elevation; Fig. 2 is a plan view of the tool-holder with the end of a tool inserted therein; Fig. 3 is a sectional end view taken through line 3—3 Fig. 1; Fig. 4 is a side view of that portion of a tool-holder which is secured to the machine with which the same is to be used, with the other parts of the holder removed.

In the embodiment of my invention, 1 represents a section of the end of the tail-stock of the machine with which my holder may be used; 2 is a tapering center formed upon the holder, which is shaped to fit in a hole in the tail-stock of the machine. This center 2 has a hole 3 in it, designed to receive a double-end removable center 4 provided with a male center 5 at one end and the female center 6 at the other, and arranged to receive a tool having either a male or female center, as the case may be.

In the illustration shown in Fig. 1, 7 is the shank of a tool, either a reamer or drill, and which is provided with a male center 8 for the purpose of illustrating the use of my tool-holder. There is secured to the center 2 of the tool-holder the portion 9 having wings 10 and 11 extending laterally outward from it, which wings 10 and 11 are provided with the grooves 12 and 13 adapted to receive the ends 14 and 15 of the part 16 in which the tool is secured, the tool being secured in the hole 17, which hole is so shaped that tools having shanks of different sizes may be secured therein in such manner that their centers will be automatically centered to the axis of rotation of the tool-holder, irrespective of the size of the tool. The meeting faces of the bottom of the grooves 12 and 13 and the faces 19 and 20 of the portion 16 in which the tool is secured, are so positioned that the holder 16 may be put in with its ends 14 and 15, either in the position shown in Fig. 3, or it may be reversed and still have the center of the tool held in the holder 16 come in exact alinement with the center in the double-end center-piece 4.

Another of the purposes of my improved tool holder is, when a tool is secured in the holder 16 by means of the binding-screw 21, and the part 16 dropped with its ends 14 and 15 within the grooves 12 and 13, to prevent the tool 7 from being moved or pulled endwise in either direction, as I provide means whereby it is firmly held by the sides of the portions 14 and 15 contacting with the sides of the grooves 12 and 13. This prevents what we term the hogging or catching of the tool. Further, when used in a lathe the part 9 and its center 2 may be firmly secured in the tail-stock 1 against rotation or endwise movement, and thereby prevent rotation of the tool 7 when the binding screw 21 is securely pressed against the shank 7 and the holder 16 is placed in the grooves 12 and 13 in the holder 9, as illustrated in Figs. 1, 2 and 3.

I do not wish to confine myself to the exact form of the parts as shown herein or to its use with any particular machine-tool, or any particular type of small tool, such as drills, reamers, etc. except as necessitated by the appended claims, as its shape may be varied, it may be used with various kinds of machine-tools, and with various kinds and types of small cutting tools.

What I claim is—

1. A holder adapted to be used with machine tools, comprising a member arranged to be secured to a machine tool and provided with oppositely disposed members having guiding grooves formed therein; a second member having oppositely disposed guiding surfaces adapted to detachably engage and slide in said guiding grooves so as to prevent axial movement of said second member, as well as rotative movement in one direction, but permitting slight rotative movement in the other direction which will permit the disengagement of said member; and means for detachably securing an article in said second member so as to bring its axis in line with the axis of said holder.

2. A holder adapted to be used with machine tools, comprising a member arranged to be secured to a machine tool and provided with oppositely disposed members having guiding grooves formed therein; a second member having oppositely disposed guiding surfaces adapted to detachably engage and slide in said guiding grooves so as to prevent axial movement of said second member, as well as rotative movement in one direction, but permitting slight rotative movement in the other direction which will permit the disengagement of said members; means for detachably securing an article in said second member so as to bring its axis in line with the axis of said holder; and a centering device for centering and holding an article against lateral movement.

In testimony whereof, I have hereunto set my hand, in the presence of two subscribing witnesses, this the 7th day of May, A. D. 1914.

STEPHEN G. GRADY.

Witnesses:
P. W. PEZZETTI,
R. P. ELLIOTT.

Copies of this patent may be obtained for five cents each, by addressing the "Commissioner of Patents, Washington, D. C."